US010393043B2

(12) United States Patent
Pannuzzo et al.

(10) Patent No.: US 10,393,043 B2
(45) Date of Patent: Aug. 27, 2019

(54) SYSTEM AND METHOD FOR ADAPTING COMBUSTION TO MITIGATE EXHAUST OVERTEMPERATURE

(71) Applicant: GM GLOBAL TECHNOLOGY OPERATIONS LLC, Detroit, MI (US)

(72) Inventors: Andrea Pannuzzo, Turin (IT); Andrea Dutto, Turin (IT); Luca Gatti, Turin (IT); Cristian Taibi, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 223 days.

(21) Appl. No.: 15/642,699

(22) Filed: Jul. 6, 2017

(65) Prior Publication Data

US 2019/0010883 A1 Jan. 10, 2019

(51) Int. Cl.

| | |
|---|---|
| ***F02D 41/02*** | (2006.01) |
| ***F01N 11/00*** | (2006.01) |
| ***F02D 41/00*** | (2006.01) |
| ***F02D 41/30*** | (2006.01) |
| ***F02D 41/40*** | (2006.01) |
| ***F02D 41/14*** | (2006.01) |

(52) U.S. Cl.

CPC ........ *F02D 41/0235* (2013.01); *F01N 11/002* (2013.01); *F02D 41/0002* (2013.01); *F02D 41/0052* (2013.01); *F02D 41/1441* (2013.01); *F02D 41/3076* (2013.01); *F02D 41/401* (2013.01); *F02D 41/402* (2013.01); *F02D 41/405* (2013.01); *F01N 2430/06* (2013.01); *F01N 2550/02* (2013.01); *F01N 2550/04* (2013.01); *F01N 2560/06* (2013.01); *F01N 2900/1602* (2013.01); *F01N 2900/1631* (2013.01); *F02D 2041/0265* (2013.01); *F02D 2200/0802* (2013.01)

(58) Field of Classification Search

CPC ............ F02D 41/0235; F02D 41/0002; F02D 41/0052; F02D 41/4441; F02D 41/3076; F02D 41/401; F02D 41/402; F02D 41/405; F02D 2041/0205; F02D 2200/0302; F01N 11/002; F01N 2430/06; F01N 2550/02; F01N 2550/04; F01N 2560/06; F01N 2900/1602; F01N 2900/1631

See application file for complete search history.

(56) References Cited

U.S. PATENT DOCUMENTS

| | | | | |
|---|---|---|---|---|
| 9,714,618 B2 * | 7/2017 | Byrd | .................. | F02D 41/0007 |
| 2011/0146243 A1 * | 6/2011 | Yanakiev | ........... | B01D 53/9477 60/285 |

* cited by examiner

*Primary Examiner* — Hieu T Vo
(74) *Attorney, Agent, or Firm* — Lorenz & Kopf LLP

(57) ABSTRACT

A system and method for monitoring the temperature in a vehicle after-treatment system is provided. The system includes one or more temperature sensors positioned in the vehicle after-treatment system and an electronic control unit (ECU) configured by programming instructions encoded in computer readable media to execute a method. The method includes monitoring the temperature presented by the one or more temperature sensors, executing a lower oxygen combustion strategy for a slower exothermic reaction when the temperature exceeds a first threshold level, and deactivating the lower oxygen combustion strategy when the temperature drops below a second threshold level.

20 Claims, 6 Drawing Sheets

SYSTEM AND METHOD FOR ADAPTING COMBUSTION TO MITIGATE EXHAUST OVERTEMPERATURE

TECHNICAL FIELD

The present disclosure generally relates to vehicles having an internal combustion engine, and more particularly relates to temperature regulation in vehicle after-treatment systems.

BACKGROUND

Exhaust gases in a vehicle may be directed into an after-treatment system. The after-treatment system may include an exhaust pipe having one or more exhaust after-treatment devices. The after-treatment devices may be any device configured to change the composition of the exhaust gases, typically to reduce the emission of pollutants in the exhaust gases such as carbon monoxide, nitrogen oxides, hydrocarbons or soot.

Some after-treatment devices require heating to temperatures that are higher than those typically provided by the engine exhaust gases to initiate the desired catalytic reaction or to otherwise achieve the desired operating temperature of the after-treatment device. Due to various factors, the heating of after-treatment devices to temperatures that are higher than those typically provided by the engine exhaust gases could lead to an exhaust over temperature condition in the exhaust components (e.g., catalysts, pipes and sensors). In extreme conditions, an exhaust over temperature condition may lead to damaged exhaust components and non-exhaust vehicle parts (e.g., electrical wires, brake wires, and others).

Accordingly, it is desirable to implement a temperature reduction strategy to mitigate an exhaust over temperature condition. Furthermore, other desirable features and characteristics of the present invention will become apparent from the subsequent detailed description and the appended claims, taken in conjunction with the accompanying drawings and the foregoing technical field and background.

SUMMARY

A method in a vehicle is provided. In one embodiment, the method includes monitoring the temperature in a vehicle after-treatment system, executing a lower oxygen combustion strategy for a slower exothermic reaction when the temperature exceeds a first threshold level, and deactivating the lower oxygen combustion strategy when the temperature drops below a second threshold level.

The monitoring may be performed by a vehicle electronic control unit (ECU).

The executing may be performed under the control of the ECU.

The deactivating may be performed under the control of the ECU.

The lower oxygen combustion strategy may include reducing oxygen content by reducing airflow into one or more combustion cylinders.

The lower oxygen combustion strategy may include reducing oxygen content by adding EGR gases into one or more combustion cylinders.

The lower oxygen combustion strategy may include delaying the main injection SOI (start of injection).

The lower oxygen combustion strategy may include reducing the air-to-fuel ratio and combustion efficiency in the combustion chamber by adding one or more after injections.

The lower oxygen combustion strategy may include reducing oxygen content in the after-treatment system by adding one or more post injections.

The method may further include determining if the lower oxygen combustion strategy is reducing the temperature at a satisfactory rate and executing a different lower oxygen combustion strategy when the temperature was not reducing at a satisfactory rate.

The method may further include executing a lower oxygen combustion strategy for a slower exothermic reaction when the temperature increases at an unsatisfactory rate and deactivating the lower oxygen combustion strategy when the temperature no longer increases at an unsatisfactory rate.

A system for monitoring the temperature in a vehicle after-treatment system is provided. In one embodiment, the system includes one or more temperature sensors positioned in the vehicle after-treatment system and an electronic control unit (ECU) configured by programming instructions encoded in computer readable media to execute a method. The method includes monitoring the temperature presented by the one or more temperature sensors, executing a lower oxygen combustion strategy for a slower exothermic reaction when the temperature exceeds a first threshold level, and deactivating the lower oxygen combustion strategy when the temperature drops below a second threshold level.

The lower oxygen combustion strategy may include reducing oxygen content by reducing airflow into one or more combustion cylinders.

The lower oxygen combustion strategy may include reducing oxygen content by adding EGR gases into one or more combustion cylinders.

The lower oxygen combustion strategy may include delaying the main injection SOI (start of injection).

The lower oxygen combustion strategy may include reducing the air-to-fuel ratio and combustion efficiency in the combustion chamber by adding one or more after injections.

The lower oxygen combustion strategy may include reducing oxygen content in the after-treatment system by adding one or more post injections.

The method executed by the ECU in the system may further include determining if the lower oxygen combustion strategy is reducing the temperature at a satisfactory rate and executing a different lower oxygen combustion strategy when the temperature was not reducing at a satisfactory rate.

The method executed by the ECU in the system may further include executing a lower oxygen combustion strategy for a slower exothermic reaction when the temperature increases at an unsatisfactory rate and deactivating the lower oxygen combustion strategy when the temperature no longer increases at an unsatisfactory rate.

A system for monitoring the temperature in an after-treatment system configured to treat exhaust gases expelled by an internal combustion engine is provided. In one embodiment, the system includes one or more temperature sensors positioned in the after-treatment system and an electronic control unit (ECU) configured by programming instructions encoded in non-transitory computer readable media to execute a method. The method includes monitoring the temperature presented by the one or more temperature sensors and executing a lower oxygen combustion strategy for a slower exothermic reaction when the temperature increases at an unsatisfactory rate. The lower oxygen combustion strategy includes reducing oxygen content by reducing airflow into one or more combustion cylinders and reducing oxygen content by adding EGR gases into one or more combustion cylinders. The lower oxygen combustion strategy further includes delaying the main injection SOI (start of injection), reducing the air-to-fuel ratio and combustion efficiency in the combustion chamber by adding one or more after injections, and reducing oxygen content in the after-treatment system by adding one or more post injections. The method further includes deactivating the lower oxygen combustion strategy when the temperature no longer increases at an unsatisfactory rate.

DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter.

Figure 1:
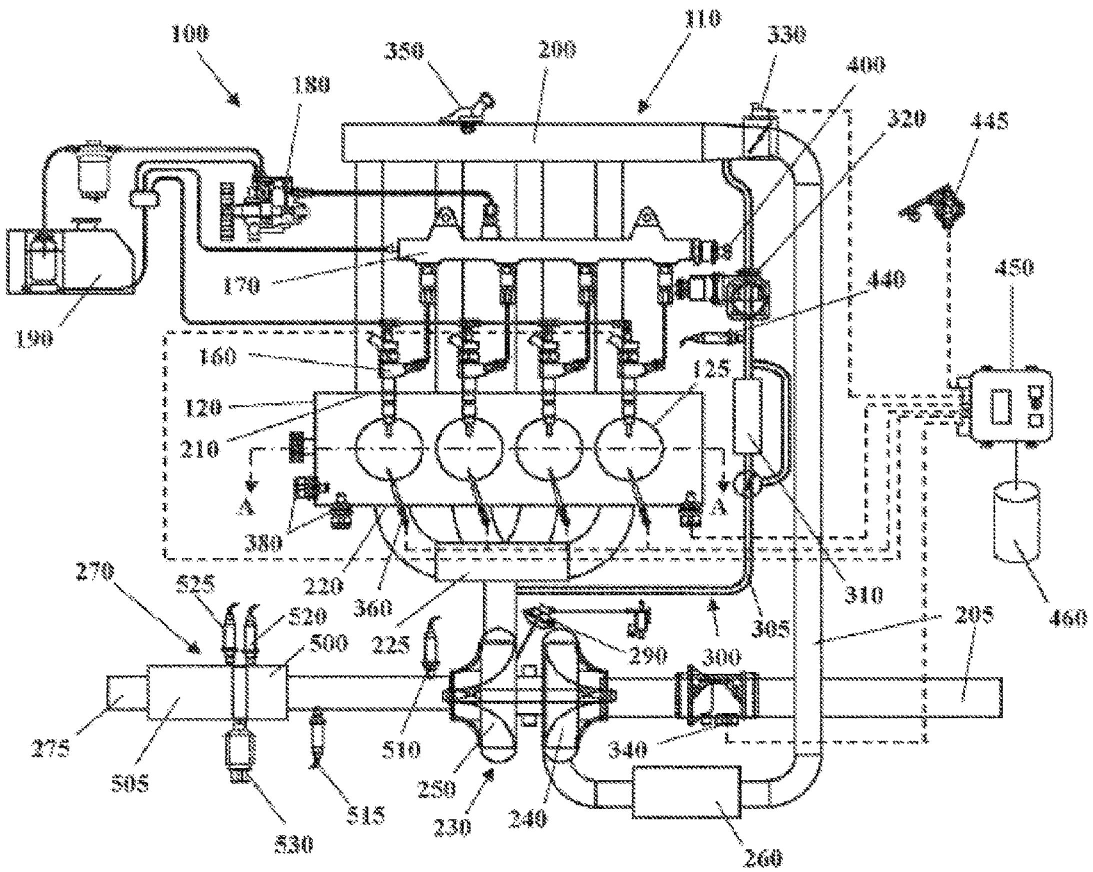
FIG. 1 schematically shows an example automotive system, in accordance with some embodiments.
Figure 2:
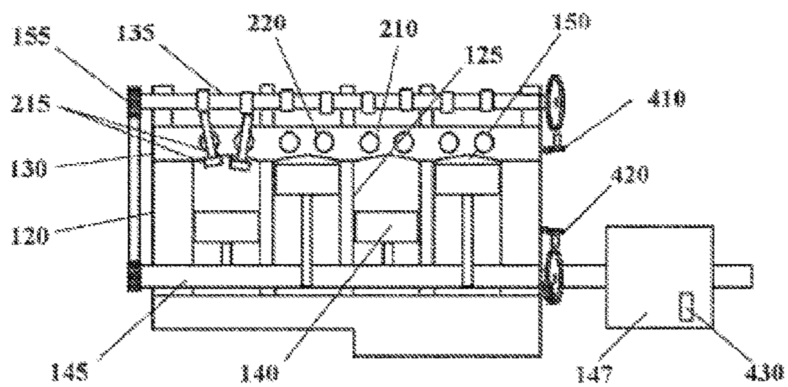
FIG. 2 is the section A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gases causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each one of the cylinders 125 has at least two valves 215, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake pipe 205 may provide air from the ambient environment to the intake manifold 200. In other embodiments, a throttle body 330 may be provided to regulate the flow of air into the manifold 200. In some embodiments, a throttle valve may be provided in the intake air system. The opening angle of the valve may determine how much fresh air or air/fuel mixture flows into the cylinders. In still other embodiments, a forced air system such as a turbocharger 230, having a compressor 240 rotationally coupled to a turbine 250, may be provided. Rotation of the compressor 240 increases the pressure and temperature of the air in the intake pipe 205 and manifold 200. An intercooler 260 disposed in the intake pipe 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate valve.

Some embodiments may include an exhaust gas recirculation (EGR) system 300 including an EGR conduit 305 that fluidly connects the outlet of the exhaust manifold 225 or the exhaust pipe 275 with the inlet of the intake manifold 200, thereby allowing part of the exhaust gas to be mixed with the air. The EGR system 300 may further include an EGR cooler 310 located in the EGR conduit 305 to reduce the temperature of the exhaust gases in the EGR system 300. An EGR valve 320 may be provided for regulating the flow rate of exhaust gases in the EGR conduit 305. The EGR system may include a "short route" (SR) or high pressure (HP) EGR circuit from the exhaust manifold 225 to the intake manifold 200, a "long route" (LR) or low pressure (LP) EGR circuit from the exhaust pipe 275 to the intake manifold 200, or both.

Downstream of the turbine 250, the exhaust gases are directed into an after-treatment system 270. The after-treatment system 270 may include an exhaust pipe 275 having one or more exhaust after-treatment devices. The after-treatment devices may be any device configured to change the composition of the exhaust gases. Some examples of after-treatment devices include, but are not limited to, catalytic converters (two and three way), oxidation catalysts such as a diesel oxidation catalyst (DOC), NOx abatement devices such as lean NOx traps, hydrocarbon absorbers, selective catalytic reduction (SCR) systems, particulate filters such as diesel particulate filters (DPFs), and sulfur traps.

The after-treatment devices may require certain conditions to exist in the engine exhaust gas for optimal performance. For example, NOx abatement devices and oxidation catalysts, have a temperature window within which the devices activate, regenerate, or operate with high conversion efficiency. Some after-treatment devices require heating of the device to temperatures that are higher than those typically provided by the engine exhaust gases to initiate the desired catalytic reaction or to otherwise achieve the desired operating temperature of the after-treatment device. One example of such a device is a DPF.

A DPF is configured to trap particulates carried by a diesel engine exhaust flow. DPFs accept exhaust flow at one end and trap particulates as exhaust gases diffuse through thin channel walls and exit out the other end. Particulate buildup in the DPF should be periodically cleared out to prevent the filter from becoming obstructed. Clearing of the particulate buildup can be performed by a regeneration process wherein the temperature of the DPF is raised to a level sufficient to cause combustion and vaporization of the particulates captured by the DPF.

Regeneration may be performed passively (from the engine's exhaust heat or by adding a catalyst to the DPF) or actively by introducing very high heat into the after-treatment system. An onboard engine control module can use a variety of strategies to actively introduce very high heat into the after-treatment system. The exhaust temperature may be increased using late fuel injection or injection during the exhaust stroke, a fuel borne catalyst to reduce soot burn-out temperature, a fuel burner such as a hydrocarbon injector (HCl) to inject diesel fuel into the exhaust stream during active regeneration, a catalytic oxidizer with after injection, and other methods.

Figure 3:
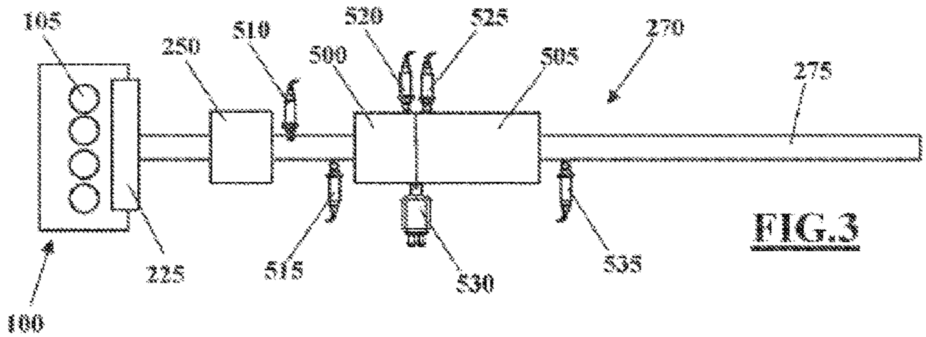
FIG. 3 schematically shows the layout of an example after-treatment system, in accordance with some embodiments.

In the embodiment of FIGS. 1 and 3, the after-treatment system 270 includes a first catalyst 500 operating both as a lean NOx trap and a diesel oxidation catalyst (LNT-DOC), which is disposed in the exhaust pipe 275 in proximity of the turbine 250, and a diesel particulate filter (DPF) 505 disposed in the exhaust pipe 275 downstream of the LNT-DOC 500. The LNT-DOC 500 and the DPF 505 may be accommodated inside a common housing. A lambda sensor 510 and a temperature sensor 515 may be located in the exhaust pipe 275 between the turbine 250 and the LNT-DOC 500, to respectively measure the oxygen concentration and the temperature of the exhaust gas at the inlet of the LNT-DOC 500. A second lambda sensor 520 and a second temperature sensor 525 may be located in the housing between the LNT-DOC 500 and the DPF 505, to respectively measure the oxygen concentration and the temperature of the exhaust gas at the inlet of the DPF 505. A pressure sensor 530 may be provided for measuring the pressure drop across the DPF 505. A soot sensor 535 may be also disposed in the exhaust pipe 275 downstream of the DPF 505, to measure the soot concentration in the exhaust gas.

Figure 4:
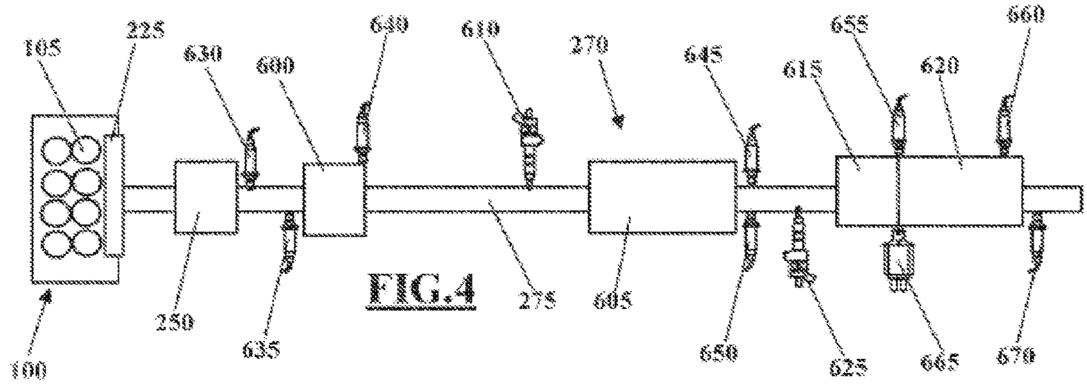
FIG. 4 schematically shows the layout of another example after-treatment system, in accordance with some embodiments.

In other embodiments (for example 8-cylinder engines), the after-treatment system 270 may include a diesel oxidation catalyst (DOC) 600 located in the exhaust pipe 275 in proximity of the turbine 250, as shown in FIG. 4. A selective catalytic reduction (SCR) system may be disposed in the exhaust pipe 275 downstream of the DOC 600, which includes an SCR catalyst 605 and an injector 610 located upstream of the SCR catalyst 605. The injector 610 is provided for injecting, into the exhaust pipe 275, a diesel exhaust fluid (DEF), for example urea, which mixes with the exhaust gas and is absorbed inside the SCR catalyst 605, where it is used to convert nitrogen oxides (NOx) into diatomic nitrogen (N2) and water. Downstream of the SCR catalyst 605, the after-treatment system 270 may include a second DOC 615 and a DPF 620 located in the exhaust pipe 275 downstream of the DOC 615. The DOC 615 and the DPF 620 may be accommodated inside a common housing. Between the SCR catalyst 605 and the second DOC 615, an injector 625 may be provided for injecting hydrocarbons (HC) inside the exhaust pipe 275. A first NOx sensor 630 may be located in the exhaust pipe 275 between the turbine 250 and the first DOC 600, to measure the concentration of nitrogen oxides. Two temperature sensors 635 and 640 may be provided for measuring the exhaust gas temperature upstream and downstream of the first DOC 600. A second NOx sensor 645 and a third temperature sensor 650 may be located in the exhaust pipe 275, between the SCR catalyst 605 and the HC injector 625, to respectively measure the nitrogen oxides concentration and the temperature of the exhaust gas. A fourth and a fifth temperature sensor 655 and 660 may be provided for measuring the exhaust gas temperature respectively at the inlet and at the outlet of the DPF 620. A pressure sensor 665 may be provided for measuring the pressure drop across the DPF 620. A soot sensor 670 may be also located in the exhaust pipe 275 downstream of the DPF 620, to measure the soot concentration in the exhaust gas.

Figure 5:
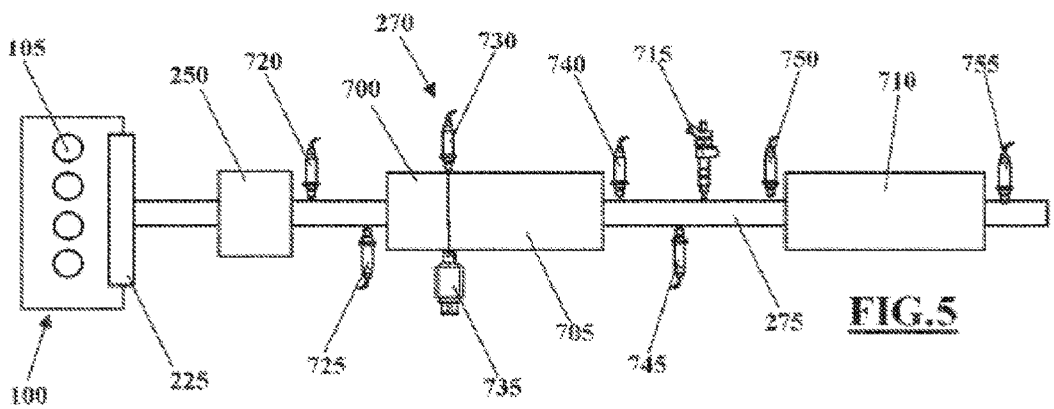
FIG. 5 schematically shows the layout of another example after-treatment system, in accordance with some embodiments.

In still other embodiments, the after-treatment system 270 may include a diesel oxidation catalyst (DOC) 700 located in the exhaust pipe 275 in proximity of the turbine 250 and a DPF 705 located in the exhaust pipe 275 downstream of the DOC 700, as shown in FIG. 5. The DOC 700 and the DPF 705 may be accommodated inside a common housing. A selective catalytic reduction (SCR) system may be disposed in the exhaust pipe 275 downstream of the DPF 705, which includes an SCR catalyst 710 and an DEF injector 715 located upstream of the SCR catalyst 710. A lambda sensor 720 and a temperature sensor 725 may be disposed in the exhaust pipe 275 between the turbine 250 and the DOC 700, to respectively measure the oxygen concentration and the temperature of the exhaust gas. A second temperature sensor 730 may be located in the common housing between the DOC 700 and the DPF 705, to measure the exhaust gas temperature at the inlet of the DPF 705. A pressure sensor 735 may be also provided for measuring the pressure drop across the DPF 705. A soot sensor 740 and a third temperature sensor 745 may be located in the exhaust pipe 275 between the DPF 705 and the DEF injector 715, to measure the soot concentration and the temperature of the exhaust gas respectively. Two NOx sensors 750 and 755 may be finally provided for measuring the concentration of nitrogen oxides at the inlet and the outlet of the SCR catalyst 710.

The automotive system 100 may further include an electronic control unit (ECU) 450 in communication with one or more sensors and/or devices associated with the ICE 110 (see FIG. 1). The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, a sensor 430 for sensing the gear engaged in the gear box 147, an EGR temperature sensor 440, and an accelerator pedal position sensor 445. The sensors may also include the sensors of the after-treatment system 270 discussed above. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. The dashed lines depicted in FIG. 1 are provided to illustrate communication between the ECU 450 and various sensors and devices, but some are omitted for clarity.

The ECU 450 may include a digital central processing unit (CPU) in communication with a memory system and an interface bus. The CPU is configured to execute programming instructions stored as a computer program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The computer program may embody the methods disclosed herein, allowing the CPU to carryout out the methods and control the ICE 110.

The computer program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier. The carrier may be transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In the case of a non-transitory computer program product, the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like.

Instead of an ECU 450, the automotive system 100 may have a different type of processor to provide the electronic logic, e.g. an embedded controller, an onboard computer, or any processing module that might be deployed in the vehicle.

One of the tasks of the ECU 450 is that of operating each fuel injectors 160 to supply the fuel into the corresponding combustion chamber 150. In general, for any engine cycle, the fuel injector 160 may be operated to perform a single fuel injection or, more often, to perform a plurality of additional fuel injections (also referred as injection pulses) per a predetermined multi-injection pattern.

The multi-injection pattern usually includes a main fuel injection, which is performed shortly before the piston 140 reaches the top death center position (TDC) at the end of the compression stroke. The main fuel injection supplies a relatively large quantity of fuel, which can generate, at the crankshaft 145, a torque corresponding to the demand of the driver.

The multi-injection pattern may also include one or more pilot injections, which are performed during the compression stroke of the piston 140, prior to the main injection. The quantity of fuel supplied by each pilot injection is normally a relatively small quantity, for example of about 1 $mm^3$ of fuel, and has the effect of reducing the explosiveness of the main injection and thus the vibration of the engine 110.

The multi-injection pattern may also include one or more after injections. An after injection is an injection of fuel that is performed inside the combustion chamber 150 after the piston 140 has passed the top death position (TDC) at the beginning of the expansion stroke, but before the opening of the exhaust port 220. The quantity of fuel supplied by an after injection burns inside the combustion chamber 150 with lower efficiency than when supplied by a main/pilot injection thereby increasing the temperature of the exhaust gases that, after the opening of the exhaust port 220, will flow towards the after-treatment system 270.

The multi-injection pattern may also include one or more post injections. A post injection is an injection of fuel that is performed inside the combustion chamber 150 after the opening of the exhaust port 220 at the end of the expansion stroke. The quantity of fuel supplied by means of a post injection, which is normally a relatively small quantity (e.g. 1 $mm^3$), does not burn inside the combustion chamber 150 but is discharged unburnt through the exhaust port 220 towards the after-treatment system 270. As a matter of fact, this quantity of fuel may burn or oxidize along the exhaust pipe 275 or within the after-treatment devices, thereby producing hot exhaust gases that can locally heat such devices.

The ECU 450 may be configured to perform a multi-injection pattern having after injections and/or post injections, only during the regeneration of the particulate filter 505 (or 620 or 705 depending on the layout of the after-treatment system 270). The ECU 450 may be also configured to take advantage of the heating effect of the after injections, the pilot injections, and/or the post injections to speed up the warm up of the after-treatment system 270 after the start of the engine 110 and/or under other predetermined conditions, to improve the efficiency of the after-treatment system 270.

While operating the fuel injection per a multi-injection pattern, the warm up strategy may also include allowing a recirculation of exhaust gas from the exhaust manifold 225 to the intake manifold 200 of the engine 110. To obtain this recirculation, the ECU 450 may be configured to operate the EGR valve 320 to open at least partially the EGR conduit 305, thereby letting the exhaust gas pass therein.

Due to various factors, an exhaust over temperature condition could occur in the exhaust components (e.g., catalysts, pipes and sensors). In an extreme condition, an exhaust over temperature condition may lead to damaged exhaust components and non-exhaust vehicle parts (e.g., electrical wires, brake wires, and others). An exhaust over temperature condition can also lead to a vehicle fire in extreme cases.

An exhaust over temperature condition may occur due to causes such as a clogged diesel particulate filter (DPF), an inefficient diesel oxidation catalyst (DOC), a mechanically stuck open hydrocarbon exhaust injector (HCl), and other conditions in the exhaust after-treatment system. For example, a mechanically stuck open HCl could lead to temperatures above 900° C. and conducting a DPF regeneration with an inefficient DOC could lead to temperatures above 850° C.

Figure 6:
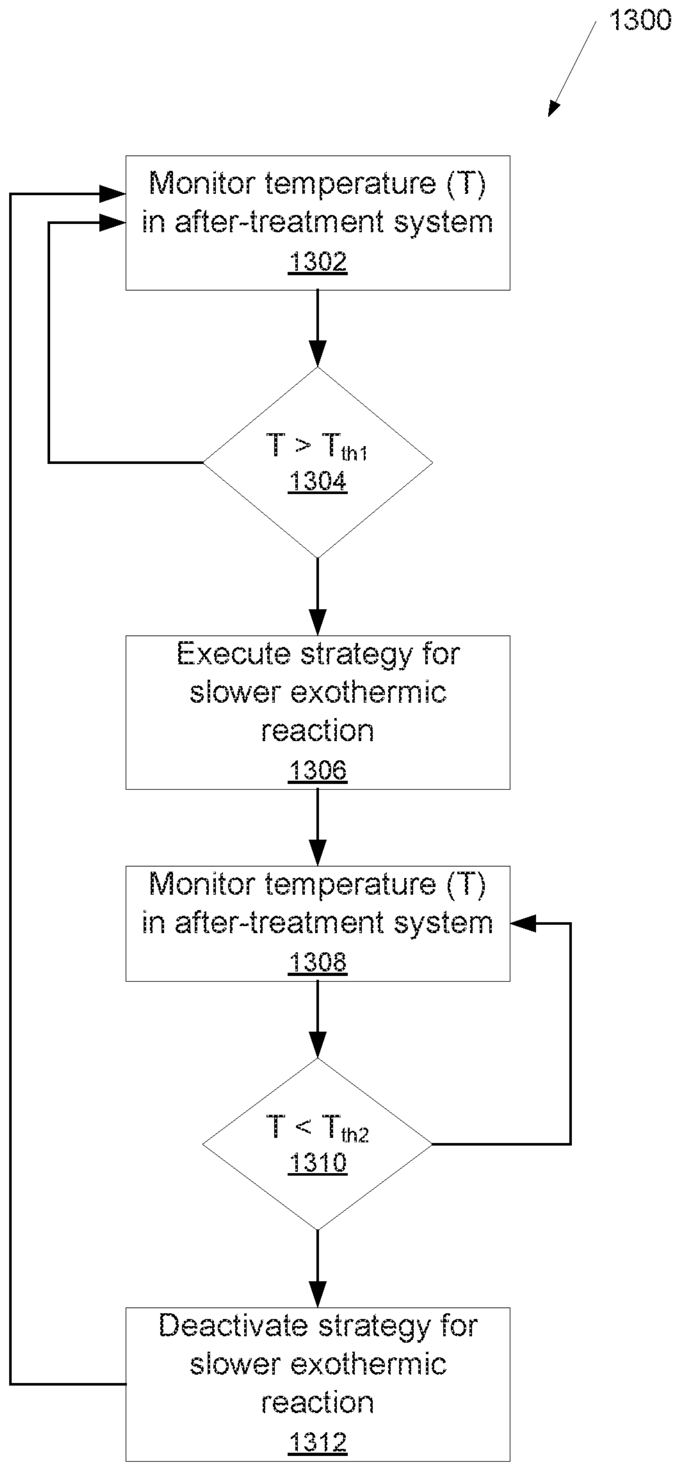
FIG. 6 is a process flow chart depicting an example process in a vehicle for implementing a temperature reduction strategy to mitigate an exhaust over temperature condition, in accordance with some embodiments.

FIG. 6 is a process flow chart depicting an example process 1300 in a vehicle for implementing a temperature reduction strategy to mitigate an exhaust over temperature condition. The combination of hydrocarbons and soot in the exhaust gases in the after-treatment system mixed with oxygen can lead to an exothermic reaction that raises the temperature of the after-treatment system. To reduce the temperature of the after-treatment system, the concentration of oxygen in the after-treatment system may be reduced to cause a slower exothermic reaction that may result in a lower after-treatment system temperature.

In the example process 1300, a vehicle, using an ECU in this example, can monitor the temperature in the after-treatment system (operation 1302). The ECU may be configured to monitor one or more of the temperature sensors 340, 350, 515, 525, 635, 640, 650, 655, 660, 725, 730, 745 to determine if an exhaust over temperature condition exists.

The ECU may determine that an exhaust over temperature condition exists when the temperature (T) measured at the one or more temperature sensors exceeds a first temperature threshold level ($T_{th1}$) (operation 1304). If the temperature T does not exceed the first temperature threshold level ($T_{th1}$) (no at operation 1304), the ECU may continue to monitor the temperature in the after-treatment system. If the temperature T exceeds the first temperature threshold level ($T_{th1}$) (yes at operation 1304), to reduce the temperature T the ECU may execute a strategy to slow down the exothermic reaction causing the rise in temperature T (operation 1306).

After commencing the execution of the strategy for a slower exothermic reaction, the ECU may continue to monitor the one or more temperature sensors to determine if an exhaust over temperature condition continues to exist (operation 1308). The ECU may determine that an exhaust over temperature condition does not exist if the temperature T falls below a second temperature threshold level ($T_{th2}$) (operation 1310). The second temperature threshold level ($T_{th2}$) may equal the first temperature threshold level ($T_{th1}$) in some examples and may be less than the first temperature threshold level ($T_{th1}$) in other examples.

If the temperature T has not fallen below the second temperature threshold level ($T_{th2}$) (no at operation 1310), the ECU may continue to monitor the temperature in the after-treatment system. If the temperature T falls below the second temperature threshold level ($T_{th2}$) (yes at operation 1310), the ECU may deactivate the strategy to slow down the exothermic reaction (operation 1312). After deactivating the strategy to slow down the exothermic reaction, the ECU can continue to monitor the temperature in the after-treatment system to determine if an exhaust over temperature condition reappears (operation 1302).

Figure 7:
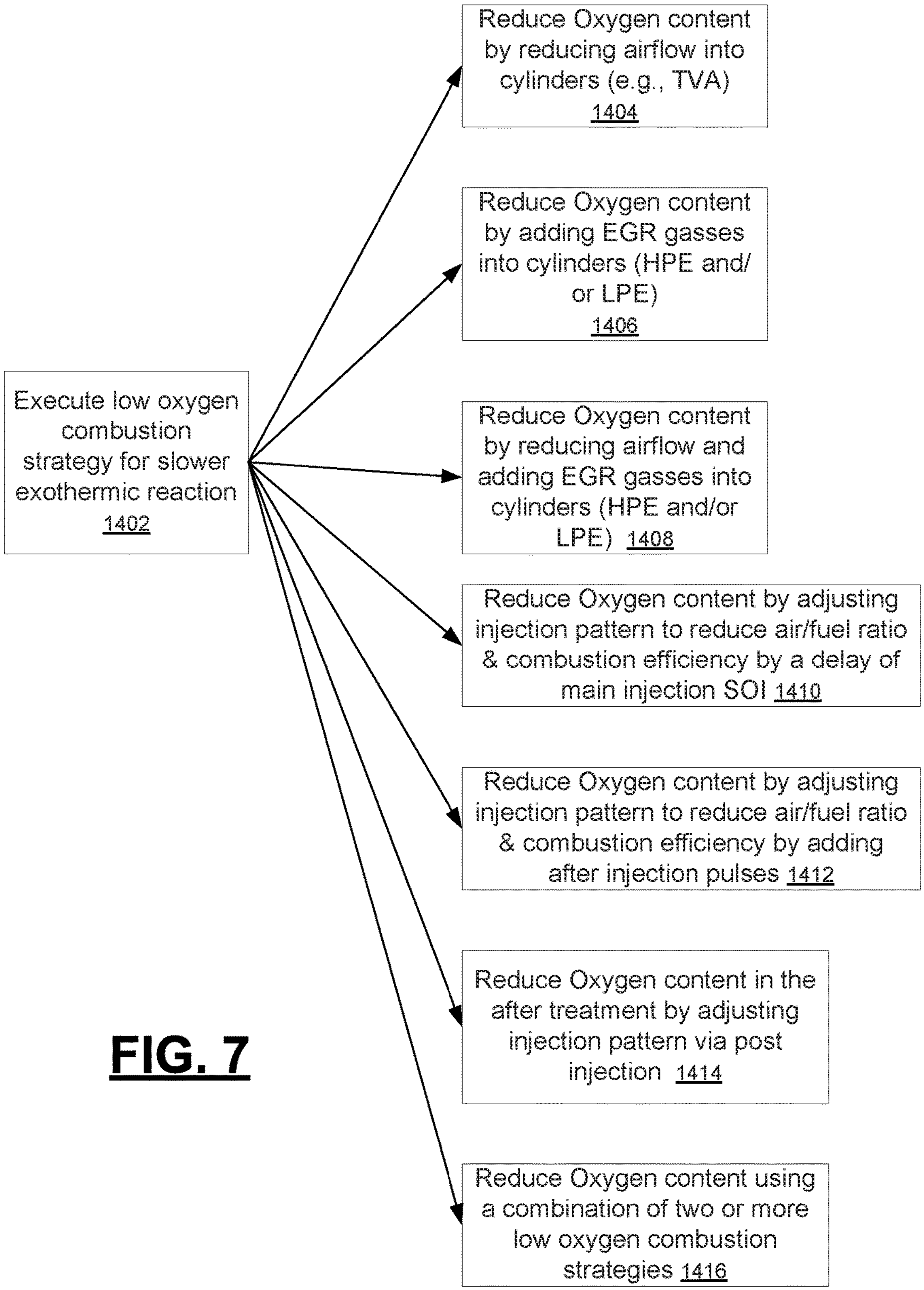
FIG. 7 is a process flow chart depicting example process options in a vehicle for implementing a temperature reduction strategy to mitigate an exhaust over temperature condition, in accordance with some embodiments.

FIG. 7 is a process flow chart depicting example process options in a vehicle for implementing a temperature reduction strategy to mitigate an exhaust over temperature condition. The ECU can be configured to execute one or more low oxygen combustion strategies for a slower exothermic reaction that can lead to a lower temperature in the after-treatment system (operation 1402).

Several low oxygen combustion strategies for reducing the oxygen content are available. One option is to reduce the oxygen content by reducing the airflow into the engine cylinders (option 1404). This can be accomplished, for example, by controlling the amount of air allowed into the cylinders using the throttle valve actuator under control of the ECU. Another option for reducing the oxygen content is to increase the amount of EGR gases added to the cylinders. This can be accomplished by adding more EGR gases from a high pressure EGR path, a low pressure EGR path, or both (option 1406) using the EGR valve 320 under control of the ECU. Yet another option for reducing the oxygen content is to reduce the airflow into the engine cylinders while increasing the amount of EGR gases added to the cylinders (option 1408). The vehicle can be configured, for example via the ECU, to control the oxygen content by controlling the airflow and the flow of EGR gases into the engine cylinders.

Another option is to reduce oxygen content by adjusting the injection pattern to reduce the air-to-fuel ratio and combustion efficiency in the combustion chamber by delaying the main injection SOI (start of injection) (option 1410). This may be accomplished by delaying or removing one or more pilot injections in a multi-injection pattern using the fuel injectors 160 under the control of the ECU. Another option is to reduce oxygen content by adjusting the injection pattern to reduce the air-to-fuel ratio and combustion efficiency in the combustion chamber by adding after injection pulses (option 1412). This may be accomplished by adding one or more after-injection pulses in a multi-injection pattern using the fuel injectors 160 under the control of the ECU. Yet another option is to reduce the oxygen content in the after-treatment system by adjusting the injection pattern via post injection (option 1414). This can be accomplished by adding post-injection pulses in a multi-injection pattern using the fuel injectors 160 under the control of the ECU. An additional option is to reduce oxygen content using a combination of two or more of reducing airflow into the cylinders, adding EGR gasses into the cylinders, delaying main injection, adding one or more after-injections, and/or adding one or more post-injections (option 1416).

Figure 8:
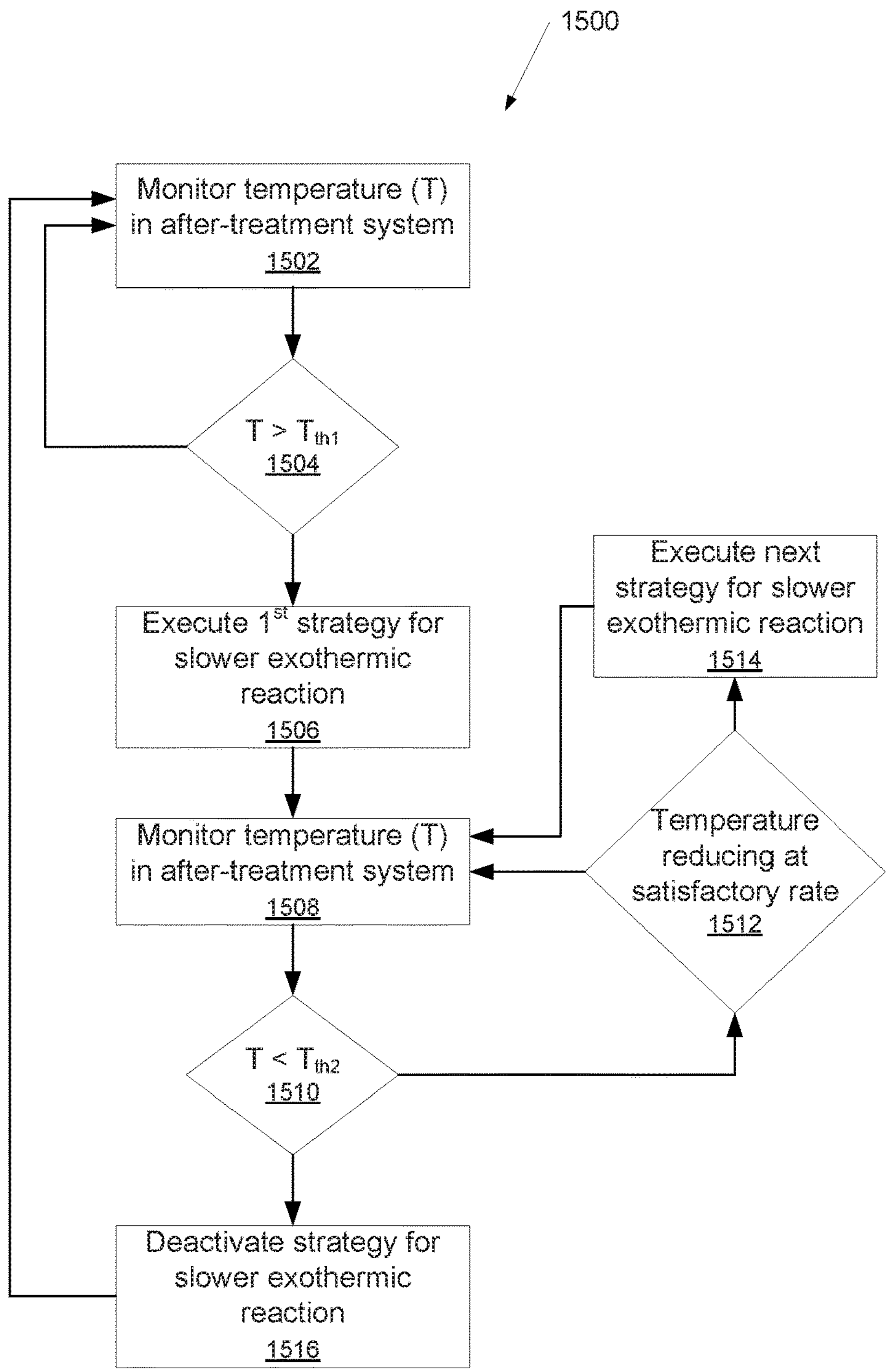
FIG. 8 is a process flow chart depicting another example process in a vehicle for implementing a temperature reduction strategy to mitigate an exhaust over temperature condition, in accordance with some embodiments.

FIG. 8 is a process flow chart depicting another example process 1500 in a vehicle for implementing a temperature reduction strategy to mitigate an exhaust over temperature condition. In the example process 1500, a vehicle, using an ECU in this example, can monitor the temperature in the after-treatment system (operation 1502). The ECU may be configured to monitor one or more of the temperature sensors 340, 350, 515, 525, 635, 640, 650, 655, 660, 725, 730, 745 to determine when an exhaust over temperature condition exists.

The ECU may determine that an exhaust over temperature condition exists when the temperature (T) measured at the one or more temperature sensors exceeds a first temperature threshold level ($T_{th1}$) (operation 1504). If the temperature T does not exceed the first temperature threshold level ($T_{th1}$) (no at operation 1504), the ECU may continue to monitor the temperature in the after-treatment system. If the temperature T exceeds the first temperature threshold level ($T_{th1}$) (yes at operation 1504), the ECU may execute a first strategy to slow down the exothermic reaction causing the rise in temperature T to reduce the temperature T (operation 1506).

After commencing the execution of the strategy for a slower exothermic reaction, the ECU may continue to monitor the one or more temperature sensors to determine whether an exhaust over temperature condition continues to exist (operation 1508). The ECU may determine that an exhaust over temperature condition does not exist if the temperature T falls below a second temperature threshold level ($T_{th2}$) (operation 1310). The second temperature threshold level ($T_{th2}$) may equal the first temperature threshold level ($T_{th1}$) in some examples and may be less than the first temperature threshold level ($T_{th1}$) in other examples.

If the temperature T has not fallen below the second temperature threshold level ($T_{th2}$) (no at operation 1510), the ECU may determine whether the temperature T is reducing at an acceptable rate (operation 1512). If the temperature T is reducing at an acceptable rate (yes at operation 1512), the ECU may continue to monitor the temperature in the after-treatment system (operation 1508). If the temperature T is not reducing at an acceptable rate (no at operation 1512), to reduce the temperature T the ECU may execute another strategy to slow down the exothermic reaction causing the rise in temperature T (operation 1514). After commencing the execution of the next strategy for a slower exothermic reaction, the ECU may continue to monitor the one or more temperature sensors to determine if an exhaust over temperature condition continues to exist (operation 1508).

If the temperature T falls below the second temperature threshold level ($T_{th2}$) (yes at operation 1510), the ECU may deactivate the strategy to slow down the exothermic reaction (operation 1516). After deactivating the strategy to slow down the exothermic reaction, the ECU can continue to monitor the temperature in the after-treatment system to determine when an exhaust over temperature condition reappears (operation 1502).

Figure 9:
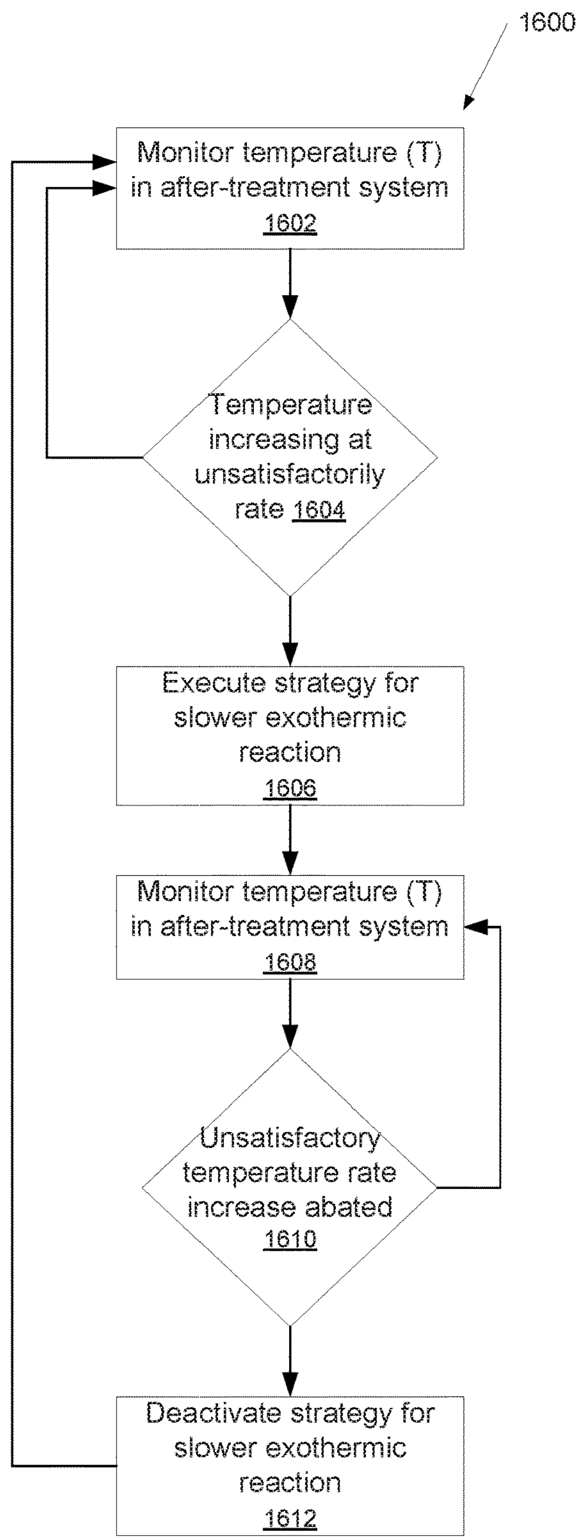
FIG. 9 is a process flow chart depicting another example process in a vehicle for implementing a temperature reduction strategy to mitigate an exhaust over temperature condition, in accordance with some embodiments.

FIG. 9 is a process flow chart depicting another example process 1600 in a vehicle for implementing a temperature reduction strategy to mitigate an exhaust over temperature condition. In the example process 1600, a vehicle, using an ECU in this example, can monitor the temperature in the after-treatment system (operation 1602). The ECU may be configured to monitor one or more of the temperature sensors 340, 350, 515, 525, 635, 640, 650, 655, 660, 725, 730, 745 to determine when an exhaust over temperature condition exists.

The ECU may determine that an exhaust over temperature condition exists if the temperature (T) measured at the one or more temperature sensors is increasing at an unsatisfactory rate (operation 1604). The unsatisfactory rate may include a combination of a temperature T that has not yet exceeded a first threshold temperature level ($T_{th1}$) coupled with an indication that the temperature will continue to rise and could eclipse the first threshold temperature level ($T_{th1}$) if the temperature rise is not abated. The indication may include a temperature rising trend (e.g., the rate of temperature change) and/or the knowledge that other activities may occur that could boost the temperature further such as DPF regeneration.

If the ECU determines that the temperature T is not increasing at an unsatisfactory rate (no at operation 1604), the ECU may continue to monitor the temperature in the after-treatment system. If the ECU determines that the temperature T is increasing at an unsatisfactory rate (yes at operation 1604), to reduce the temperature T the ECU may execute a strategy to slow down the exothermic reaction causing a rise in temperature T (operation 1606).

After commencing the execution of the strategy for a slower exothermic reaction, the ECU may continue to monitor the one or more temperature sensors to determine whether an unsatisfactory temperature rate increase continues to exist (operation 1608). If the ECU determines that the unsatisfactory temperature rate increase has not yet been abated (no at operation 1610), the ECU may continue to monitor the temperature in the after-treatment system. If the ECU determines that the unsatisfactory temperature rate increase has been abated (yes at operation 1610), the ECU may deactivate the strategy to slow down the exothermic reaction (operation 1612). After deactivating the strategy to slow down the exothermic reaction, the ECU can continue to monitor the temperature in the after-treatment system to determine when an exhaust over temperature condition returns (operation 1602).

Described herein are apparatus, systems, techniques and articles for implementing a temperature reduction strategy to mitigate an exhaust over temperature condition in a vehicle. The apparatus, systems, techniques and articles may lead to increased vehicle component performance (e.g., fewer heat related component failures). The apparatus, systems, techniques and articles may allow vehicle components such as after-treatment components (e.g., exhaust gas temperature sensors, DOC, DPF, SCR) and other vehicle components (e.g., antilock braking system control module) to have a longer life due to lower exposure to excess temperatures. The apparatus, systems, techniques and articles may be applicable to multiple types of combustion systems such as diesel combustion systems and gasoline combustion systems. The apparatus, systems, techniques and articles may be applicable to different after-treatment architectures having a particulate filter (e.g., diesel particulate filter or gasoline particulate filter). The example operations from the various example processes 1300, 1500, and 1600 and the various example oxygen content reduction options (e.g., options 1404 and 1406) may be combined in different combinations to implement a temperature reduction strategy to mitigate an exhaust over temperature condition in a vehicle In one embodiment, a method in a vehicle is provided. The method comprises monitoring the temperature in a vehicle after-treatment system, executing a lower oxygen combustion strategy for a slower exothermic reaction when the temperature exceeds a first threshold level, and deactivating the lower oxygen combustion strategy when the temperature drops below a second threshold level.

These aspects and other embodiments may include one or more of the following features. The monitoring may be performed by a vehicle electronic control unit (ECU). The executing may be performed under the control of the ECU. The deactivating may be performed under the control of the ECU. The lower oxygen combustion strategy may comprise reducing oxygen content by reducing airflow into one or more combustion cylinders. The lower oxygen combustion strategy may comprise reducing oxygen content by adding EGR gases into one or more combustion cylinders. The lower oxygen combustion strategy may comprise delaying the main injection SOI (start of injection). The lower oxygen combustion strategy may comprise reducing the air-to-fuel ratio and combustion efficiency in the combustion chamber by adding one or more after injections. The lower oxygen combustion strategy may comprise reducing oxygen content in the after-treatment system by adding one or more post injections. The method may further comprise determining if the lower oxygen combustion strategy is reducing the temperature at a satisfactory rate and executing a different lower oxygen combustion strategy if the temperature was not reducing at a satisfactory rate. The method may further comprise executing a lower oxygen combustion strategy for a slower exothermic reaction when the temperature increases at an unsatisfactory rate and deactivating the lower oxygen combustion strategy when the temperature no longer increases at an unsatisfactory rate.

In another embodiment, a method in a vehicle is provided. The method comprises monitoring the temperature in a vehicle after-treatment system and executing a lower oxygen combustion strategy for a slower exothermic reaction when the temperature increases at an unsatisfactory rate. The lower oxygen combustion strategy comprises reducing oxygen content by reducing airflow into one or more combustion cylinders and reducing oxygen content by adding EGR gases into one or more combustion cylinders. The lower oxygen combustion strategy further comprises delaying the main injection SOI (start of injection), reducing the air-to-fuel ratio and combustion efficiency in the combustion chamber by adding one or more after injections, and reducing oxygen content in the after-treatment system by adding one or more post injections. The method further comprises deactivating the lower oxygen combustion strategy when the temperature no longer increases at an unsatisfactory rate.

In another embodiment, a system for monitoring the temperature in a vehicle after-treatment system is provided. The system comprises one or more temperature sensors positioned in the vehicle after-treatment system and an electronic control unit (ECU) configured by programming instructions encoded in computer readable media to execute a method. The method comprises monitoring the temperature presented by the one or more temperature sensors, executing a lower oxygen combustion strategy for a slower exothermic reaction when the temperature exceeds a first threshold level, and deactivating the lower oxygen combustion strategy when the temperature drops below a second threshold level.

These aspects and other embodiments may include one or more of the following features. The lower oxygen combustion strategy may comprise reducing oxygen content by reducing airflow into one or more combustion cylinders. The lower oxygen combustion strategy may comprise reducing oxygen content by adding EGR gases into one or more combustion cylinders. The lower oxygen combustion strategy may comprise delaying the main injection SOI (start of injection). The lower oxygen combustion strategy may comprise reducing the air-to-fuel ratio and combustion efficiency in the combustion chamber by adding one or more after injections. The lower oxygen combustion strategy may comprise reducing oxygen content in the after-treatment system by adding one or more post injections. The method may further comprise determining if the lower oxygen combustion strategy is reducing the temperature at a satisfactory rate and executing a different lower oxygen combustion strategy if the temperature was not reducing at a satisfactory rate. The method may further comprise executing a lower oxygen combustion strategy for a slower exothermic reaction when the temperature increases at an unsatisfactory rate and deactivating the lower oxygen combustion strategy when the temperature no longer increases at an unsatisfactory rate.

In another embodiment, a system for monitoring the temperature in an after-treatment system configured to treat exhaust gases expelled by an internal combustion engine is provided. The system comprises one or more temperature sensors positioned in the after-treatment system and an electronic control unit (ECU) configured by programming instructions encoded in a non-transitory computer readable media to execute a method. The method comprises monitoring the temperature presented by the one or more temperature sensors and executing a lower oxygen combustion strategy for a slower exothermic reaction when the temperature increases at an unsatisfactory rate. The lower oxygen combustion strategy comprises reducing oxygen content by reducing airflow into one or more combustion cylinders and reducing oxygen content by adding EGR gases into one or more combustion cylinders. The lower oxygen combustion strategy further comprises delaying the main injection SOI (start of injection), reducing the air-to-fuel ratio and combustion efficiency in the combustion chamber by adding one or more after injections, and reducing oxygen content in the after-treatment system by adding one or more post injections. The method further comprises deactivating the lower oxygen combustion strategy when the temperature no longer increases at an unsatisfactory rate.

In another embodiment, a vehicle is provided. The vehicle comprises a combustion engine, an after-treatment system configured to treat exhaust gases expelled by the combustion engine, one or more temperature sensors positioned in the after-treatment system, and an electronic control unit (ECU) configured by programming instructions encoded in computer readable media to execute a method. The method comprises monitoring the temperature in a vehicle after-treatment system and executing a lower oxygen combustion strategy for a slower exothermic reaction when the temperature increases at an unsatisfactory rate. The lower oxygen combustion strategy comprises reducing oxygen content by reducing airflow into one or more combustion cylinders and reducing oxygen content by adding EGR gases into one or more combustion cylinders. The lower oxygen combustion strategy further comprises delaying the main injection SOI (start of injection), reducing the air-to-fuel ratio and combustion efficiency in the combustion chamber by adding one or more after injections, and reducing oxygen content in the after-treatment system by adding one or more post injections. The method further comprises deactivating the lower oxygen combustion strategy when the temperature no longer increases at an unsatisfactory rate.

In another embodiment, a vehicle is provided. The vehicle comprises a combustion engine, an after-treatment system configured to treat exhaust gases expelled by the combustion engine, one or more temperature sensors positioned in the after-treatment system, and an electronic control unit (ECU) configured by programming instructions encoded in computer readable media to execute a method. The method comprises monitoring the temperature in a vehicle after-treatment system a combustion engine, executing a lower oxygen combustion strategy for a slower exothermic reaction when the temperature exceeds a first threshold level, and deactivating the lower oxygen combustion strategy when the temperature drops below a second threshold level.

These aspects and other embodiments may include one or more of the following features. The lower oxygen combustion strategy may comprise reducing oxygen content by reducing airflow into one or more combustion cylinders. The lower oxygen combustion strategy may comprise reducing oxygen content by adding EGR gases into one or more combustion cylinders. The lower oxygen combustion strategy may comprise delaying the main injection SOI (start of injection). The lower oxygen combustion strategy may comprise reducing the air-to-fuel ratio and combustion efficiency in the combustion chamber by adding one or more after injections. The lower oxygen combustion strategy may comprise reducing oxygen content in the after-treatment system by adding one or more post injections. The method may further comprise determining if the lower oxygen combustion strategy is reducing the temperature at a satisfactory rate and executing a different lower oxygen combustion strategy when the temperature was not reducing at a satisfactory rate. The method may further comprise executing a lower oxygen combustion strategy for a slower exothermic reaction when the temperature increases at an unsatisfactory rate and deactivating the lower oxygen combustion strategy when the temperature no longer increases at an unsatisfactory rate.

In another embodiment, a vehicle is provided. The vehicle comprises a combustion engine, an after-treatment system configured to treat exhaust gases expelled by the combustion engine, one or more temperature sensors positioned in the after-treatment system, and an electronic control unit (ECU) configured by programming instructions encoded in computer readable media to execute a method. The method comprises monitoring the temperature in a vehicle after-treatment system and executing a lower oxygen combustion strategy for a slower exothermic reaction when the temperature exceeds a first threshold level. The lower oxygen combustion strategy comprises reducing oxygen content by reducing airflow into one or more combustion cylinders and reducing oxygen content by adding EGR gases into one or more combustion cylinders. The lower oxygen combustion strategy further comprises delaying the main injection SOI (start of injection), reducing the air-to-fuel ratio and combustion efficiency in the combustion chamber by adding one or more after injections, and reducing oxygen content in the after-treatment system by adding one or more post injections. The method further comprises deactivating the lower oxygen combustion strategy when the temperature drops below a second threshold level.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. For example, the examples are applicable to multiple types of combustion systems such as diesel combustion systems and gasoline combustion systems. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for monitoring the temperature in a vehicle after-treatment system, the system comprising:

one or more temperature sensors positioned in the vehicle after-treatment system; and an electronic control unit (ECU) configured by programming instructions encoded in a non-transitory computer readable media to execute a method, the method comprising:

monitoring the temperature presented by the one or more temperature sensors;

executing a lower oxygen combustion strategy for a slower exothermic reaction when the temperature exceeds a first threshold level; and deactivating the lower oxygen combustion strategy when the temperature drops below a second threshold level.

2. The system of claim 1, wherein the lower oxygen combustion strategy comprises reducing oxygen content by reducing airflow into one or more combustion cylinders.

3. The system of claim 2, wherein the lower oxygen combustion strategy comprises reducing oxygen content by adding EGR gases into one or more combustion cylinders.

4. The system of claim 1, wherein the lower oxygen combustion strategy comprises delaying the main injection SOI (start of injection).

5. The system of claim 1, wherein the lower oxygen combustion strategy comprises reducing the air-to-fuel ratio and combustion efficiency in the combustion chamber by adding one or more after injections.

6. The system of claim 1, wherein the lower oxygen combustion strategy comprises reducing oxygen content in the after-treatment system by adding one or more post injections.

7. The system of claim 1, wherein the method further comprises:

determining if the lower oxygen combustion strategy is reducing the temperature at a satisfactory rate; and executing a different lower oxygen combustion strategy when the temperature was not reducing at a satisfactory rate.

8. The system of claim 1, wherein the method further comprises:

executing a lower oxygen combustion strategy for a slower exothermic reaction when the temperature increases at an unsatisfactory rate; and deactivating the lower oxygen combustion strategy when the temperature no longer increases at an unsatisfactory rate.

9. A system for monitoring the temperature in an after-treatment system configured to treat exhaust gases expelled by an internal combustion engine, the system comprising:

one or more temperature sensors positioned in the after-treatment system; and an electronic control unit (ECU) configured by programming instructions encoded in a non-transitory computer readable media to execute a method, the method comprising:

monitoring the temperature presented by the one or more temperature sensors;

executing a lower oxygen combustion strategy for a slower exothermic reaction when the temperature increases at an unsatisfactory rate, the lower oxygen combustion strategy comprising reducing oxygen content by reducing airflow into one or more combustion cylinders and reducing oxygen content by adding EGR gases into one or more combustion cylinders, the lower oxygen combustion strategy further comprising delaying the main injection SOI (start of injection), reducing the air-to-fuel ratio and combustion efficiency in the combustion chamber by adding one or more after injections, and reducing oxygen content in the after-treatment system by adding one or more post injections; and deactivating the lower oxygen combustion strategy when the temperature no longer increases at an unsatisfactory rate.

10. A method in a vehicle, comprising:

monitoring the temperature in a vehicle after-treatment system;

executing a lower oxygen combustion strategy for a slower exothermic reaction when the temperature exceeds a first threshold level; and deactivating the lower oxygen combustion strategy when the temperature drops below a second threshold level.

11. The method of claim 10, wherein the monitoring is performed by a vehicle electronic control unit (ECU).

12. The method of claim 11, wherein the executing is performed under the control of the ECU.

13. The method of claim 12, wherein the deactivating is performed under the control of the ECU.

14. The method of claim 10, wherein the lower oxygen combustion strategy comprises reducing oxygen content by reducing airflow into one or more combustion cylinders.

15. The method of claim 14, wherein the lower oxygen combustion strategy comprises reducing oxygen content by adding EGR gases into one or more combustion cylinders.

16. The method of claim 10, wherein the lower oxygen combustion strategy comprises delaying the main injection SOI (start of injection).

17. The method of claim 10, wherein the lower oxygen combustion strategy comprises reducing the air-to-fuel ratio and combustion efficiency in the combustion chamber by adding one or more after injections.

18. The method of claim 10, wherein the lower oxygen combustion strategy comprises reducing oxygen content in the after-treatment system by adding one or more post injections.

19. The method of claim 10, further comprising:

determining if the lower oxygen combustion strategy is reducing the temperature at a satisfactory rate; and executing a different lower oxygen combustion strategy when the temperature was not reducing at a satisfactory rate.

20. The method of claim 10, further comprising:

executing a lower oxygen combustion strategy for a slower exothermic reaction when the temperature increases at an unsatisfactory rate; and deactivating the lower oxygen combustion strategy when the temperature no longer increases at an unsatisfactory rate.

* * * * *